(12) United States Patent
Channappa et al.

(10) Patent No.: US 10,360,589 B1
(45) Date of Patent: Jul. 23, 2019

(54) AUDIENCE DEFINITION FOR ADVERTISING SYSTEMS

(71) Applicant: Marin Software Incorporated, San Francisco, CA (US)

(72) Inventors: Anil Channappa, San Francisco, CA (US); Matt Ackley, San Francisco, CA (US); Jordan Buller, San Francisco, CA (US); Bradford Flora, San Francisco, CA (US)

(73) Assignee: Marin Software Incorporated, San Francisco, CA (US)

( * ) Notice: Subject to any disclaimer, the term of this patent is extended or adjusted under 35 U.S.C. 154(b) by 579 days.

(21) Appl. No.: 14/657,351

(22) Filed: Mar. 13, 2015

(51) Int. Cl.
G06Q 30/02 (2012.01)
G05B 19/418 (2006.01)

(52) U.S. Cl.
CPC ..... G06Q 30/0251 (2013.01); G06Q 30/0277 (2013.01)

(58) Field of Classification Search
CPC .............. G06Q 30/0251; G06Q 30/0277
See application file for complete search history.

(56) References Cited

U.S. PATENT DOCUMENTS

| | | | |
|---|---|---|---|
| 7,930,384 B1 * | 4/2011 | Lester ............... | G06Q 30/02 705/14.41 |
| 7,983,961 B1 * | 7/2011 | Chang ............... | G06Q 30/02 705/26.7 |
| 2005/0086112 A1 * | 4/2005 | Shkedi ............... | G06Q 30/02 705/14.61 |
| 2008/0059310 A1 * | 3/2008 | Lettow ............... | G06Q 30/02 705/14.73 |
| 2008/0103898 A1 * | 5/2008 | Flake ............... | G06Q 30/02 705/14.41 |
| 2011/0307479 A1 * | 12/2011 | Yin ............... | G06F 17/30867 707/728 |

(Continued)

OTHER PUBLICATIONS

"Uniform Resource Identifier (URI): Generic Syntax" Network Working Group. T. Berners-Lee. Request for Comments: 3986. Standards Track from W3C/MIT.*

(Continued)

*Primary Examiner* — Maria V Vanderhorst
(74) *Attorney, Agent, or Firm* — Fenwick & West LLP (57) ABSTRACT

An ad facilitation server receives a definition of an audience from an advertiser, the definition expressed in terms of a URL that audience members have visited, such as a regular expression for URLs. Upon receiving a URL corresponding to a visit of a visitor to a page of the advertiser, the ad facilitation server determines whether the URL matches the audience definition provided earlier; if so, the ad facilitation server sends a request to a number of different ad publishers, requesting them to add the visitor to an associated audience. When an ad impression opportunity occurs on a particular ad publisher, the publisher considers bids previously submitted by the advertiser for the audience when selecting an ad for the ad impression opportunity. Thus, advertisers are enabled to bid on specific audiences defined by prior page visits, across a number of different ad publishers constituting different advertising channels.

14 Claims, 7 Drawing Sheets

(56) References Cited

U.S. PATENT DOCUMENTS

2014/0250223 A1\* 9/2014 Heffernan ............... H04L 43/04
709/224
2014/0279065 A1\* 9/2014 Nukala .............. G06Q 30/0243
705/14.72

OTHER PUBLICATIONS

"Lesson 10-passing variables in URL". HTML.net. Tutorial. 2011.\*
"An overview of computational challenges in online advertising". Richard E. Chatwin. ISBN (Electronic): 978-1-4799-0178-4. 2013 American Control Conference. Jun. 1, 2013. (Year: 2013).\*
"Third-Party Web Tracking: Policy and Technology". J. R. Mayer . ISBN (Online): 978-0-7695-4681-0. Published in: 2012 IEEE Symposium on Security and Privacy (pp. 413-427). (Year: 2012).\*

\* cited by examiner

FIG. 1

| Term | Status | Bidding Category | ItemType | KType | Bid Override |
|---|---|---|---|---|---|
| Maisies Faux Fur Gloves | Active | Bid to Position | Glove | | Off |
| Wool Hats For Women | Active | Bid to Position | Hat | Self | Off |
| Maisies Wool Hats | Paused | Bid to Position | Hat | Self | Off |
| Tirge Wool Hats | Active | Bid to Position | Hat | Competitor | On |
| +Womens +Wayfarer +Sunglasses | Active | Bid to Position | Sunglasses | | Off |
| women's scarves | Paused | Bid to Position | Scarf | | Off |
| Moo Moo Sunglasses | Active | Bid to Position | Sunglasses | | Off |
| Fossil men trifold | Paused | Bid to Position | Wallet | | On |
| Maisie Cashmere Ear Warmer | Active | Bid to Position | Hat | | On |
| Tirge Makeup Cases | Active | Bid to Position | Makeup | Competitor | Off |
| Zikna Sunglasses Sz3290M | Active | Bid to Position | Sunglasses | | Off |

FIG. 6

AUDIENCE DEFINITION FOR ADVERTISING SYSTEMS

BACKGROUND

1. Field of Art

The present invention generally relates to the field of electronic data processing, and more specifically, to ways of defining an audience of users to which to advertise on different ad publishers across different advertising channels.

2. Description of the Related Art

In an online advertising system, advertisers contract with an advertising publisher, such as search engines like GOOGLE, YAHOO!, or MSN, or social networks like FACEBOOK or LINKEDIN, to display their advertisements. Typically, an advertiser specifies an advertising term, e.g. a single keyword or a phrase, that is relevant to its advertisements, and an amount of money ("bid") that the advertiser is willing to pay if the advertising publisher selects its advertisements for display in association with the term rather than those of another advertiser, and if a user clicks on the displayed advertisement or otherwise designates it for further viewing. Bids are generally calculated by the advertiser based on the expected probability of the occurrence of a further desired action ("conversion event") taking place. The conversion event can be, for example, the online purchase of a product associated with the advertisement. In response to a user request for information that is associated with the term (e.g., a textual query containing the term submitted to the search engine), the advertising publisher selects one or more advertisements to display from among the advertisements of all advertisers submitting a bid for that term. Based on reactions of users to the advertisements displayed for a given term and a given advertiser, the advertising publisher, or other entities, may track a number of advertising statistics, such as the term's number of advertising impressions, total number of "clicks", total number of conversions, and the like.

Term-based advertising that uses particular keywords or phrases permits an advertiser to target advertisements to a particular context defined by search terms—that is, to target users who have just searched for a particular term. An advertiser may alternatively or additionally wish, however, to target particular internet users who have performed certain prior actions, such as browsing particular pages on the advertiser's site. For example, a particular advertiser who sells items on an e-commerce cite might wish to specifically target advertisements to users who have browsed its products before but not purchased them. Unfortunately, conventional term-based advertising does not allow targeting such groups of users.

BRIEF SUMMARY

In one embodiment, a computer-implemented method comprises receiving, from an advertiser, a definition of an audience, the definition implemented in terms of a uniform resource locator (URL) expression; receiving a URL corresponding to a visitor's visit to a page of the advertiser; determining that the URL matches the URL expression; and in response to determining that the URL matches the URL expression, for each ad publisher of plurality of ad publishers, sending a request to the ad publisher to add the visitor to an audience of the advertiser.

In one embodiment, a non-transitory computer-readable storage medium comprises instructions executable by a processor, the instructions comprising instructions for receiving, from an advertiser, a definition of an audience, the definition implemented in terms of a uniform resource locator (URL) expression; instructions for receiving a URL corresponding to a visitor's visit to a page of the advertiser; instructions for determining that the URL matches the URL expression; and instructions for, in response to determining that the URL matches the URL expression, for each ad publisher of plurality of ad publishers, sending a request to the ad publisher to add the visitor to an audience of the advertiser.

In one embodiment, a computer-implemented method comprises providing, to an online advertiser, a tracking script; receiving, from the advertiser, a landing page link template specifying a base uniform resource locator (URL) and a parameter list, the parameter list including a variable reference corresponding to a property of advertising terms; generating, for an term of the advertiser that is associated with the landing page link template, a landing page URL based on the landing page link template, the landing page URL including, in place of the variable reference, a value of the property for the term; receiving, from the advertiser, a definition of an audience, the definition implemented as a regular expression for URLs, the regular expression including the value of the property for the term; receiving a URL corresponding to a visitor's visit to a page of the advertiser in response to the visitor clicking on an advertisement having the landing page URL; determining that the URL matches the regular expression; and in response to determining that the URL matches the regular expression, for each of plurality of ad publishers, sending a request to the ad publisher to add the visitor to an audience of the advertiser, the requests for the ad publishers having different formats.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
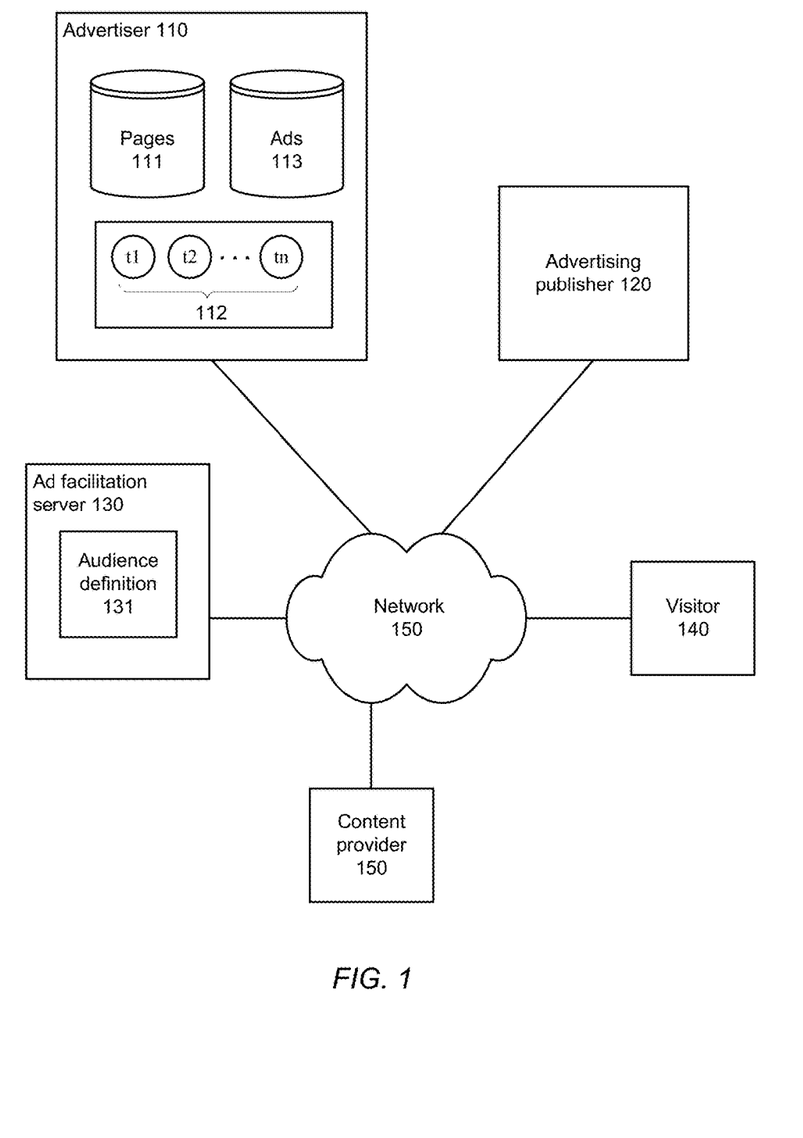
FIG. 1 illustrates a computing environment in which online advertising takes place, according to one embodiment.

FIG. 1 illustrates a computing environment in which online advertising takes place, according to one embodiment. Advertisers 110 wish to display their advertisements—which may be advertisements for their own products or services, or advertisements that they display on behalf of a different organization—in association with the content of content providers 150, such as the search results of a search engine, the user-submitted information of a social network, and the like. Accordingly, the advertisers 110 submit advertisements to an advertising publisher 120 (which may itself be a content provider 150). When an opportunity arises to display an advertisement in conjunction with the content of a content provider 150, the ad publisher 120 responsible for displaying advertisements for the content provider selects one of the advertisements previously submitted by advertisers for display.

When providing the advertisements to the ad publishers 120, the advertisers 110 may associate the advertisements with terms that trigger display of the advertisements (and with a bid amount representing a price to be paid by the advertiser 110 to the advertising publisher 120) in the event that the associated advertisement is clicked. However, rather than targeting advertisements to particular terms, in some cases the advertisers 110 may instead prefer to target particular audiences of users, the audiences defined by browsing activities that they have previously taken on the advertisers' web site. For example, an advertiser 110 may wish to advertise specifically to an audience consisting of users who have previously browsed a webpage associated with one of the advertiser's products but failed to purchase the product, or to users who have viewed the advertiser's products as a result of searching for a competitor's products. In many cases, the advertiser 110 does not wish to draw any distinctions between the different "channels"—i.e., the different advertising context provided by different advertising publishers 120, such as term-based search advertising, or social advertising on social networks—on which advertisements can be shown to the users making up a particular audience. Rather, such advertisers 110 would prefer merely to define the audience once, and have advertisements provided to that audience across each of the various possible channels.

Accordingly, an advertiser 110 communicates with an ad facilitation server 130. The ad facilitation server 130 acts as an intermediary between the advertiser 110 and the various advertising publishers 120 on which the advertiser may wish to advertise, defining and establishing audiences on the part of the advertiser for use with the various publishers, as is now described in further detail.

The advertiser 110 has a set of webpages 111 oriented towards the products and/or services that the advertiser offers to its customers. For example, a particular advertiser 110 might be a department store offering items of apparel, such as scarves, belts, shoes, and the like, and also selling the items of apparel online as part of a website that includes the pages 111. Customers of such an advertiser 110 could browse the pages 111 for the advertiser's products directly, e.g., by entering a uniform resource locator (URL) for the advertiser in their browsers, or as a result of linking to the web site using a search engine. The pages 111 may also be the "landing pages" of the advertiser's electronic advertisements 113—that is, the pages to which advertisements 113 lead when customers click on or otherwise select the advertisements after they are displayed.

Figure 2:
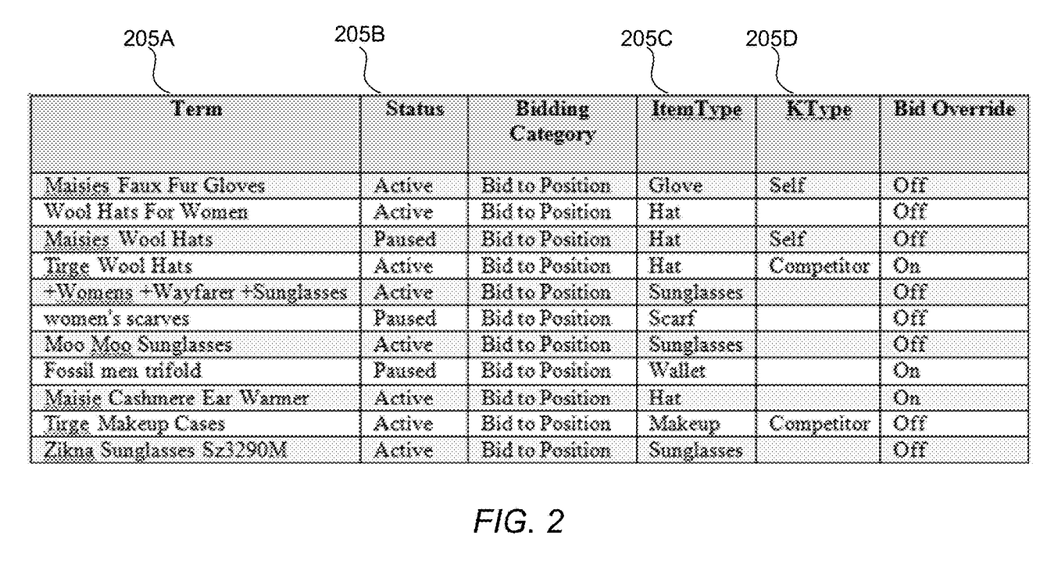
FIG. 2 is an example illustrating a portion of an advertiser user interface provided by the ad facilitation server of FIG. 1 for defining the various terms to use in a particular advertising campaign for a fictitious apparel retailer advertiser.

The advertiser 110 may target the advertisements 113 to particular terms 112, e.g., for display on an advertising publisher 120 that offers search advertisements in response to user text searches. For example, FIG. 2 is an example illustrating a portion of an advertiser user interface provided by the ad facilitation server 130 for defining the various terms to use in a particular advertising campaign for a fictitious apparel retailer advertiser 110 named "Maisies". The column 205A includes the text for each term (e.g., the text "Maisies Wool Hats" in the third row, and "Tirge Wool Hats" in the fourth row). The ad facilitation server 130 allows each term to have a number of other attributes, in addition to the term's text itself. Some of these may be defined by the ad facilitation server 130 and apply to every term, such as the status in column 205B indicating whether a term is currently being targeted. In one embodiment, the ad facilitation server 130 also allows an advertiser 110 to define its own attributes and to specify values for those attributes. For example, the advertiser 110 of the example of FIG. 2 has specified that terms have an attribute "ItemType" (column 205D), the value of the attribute specifying a general class of the item, and an attribute "KType" (column 205D), the value specifying whether the text 205A of a term indicates that a user searching for that term was searching for the products of the advertiser or of a competitor. For example, the value "Self" for the attribute 205D of the term "Maisies Wool Hats" indicates that the term is oriented towards the advertiser itself, whereas the value "Competitor" for the term "Tirge Wool Hats" indicates that the term is oriented toward a competitor of the advertiser (i.e., a fictitious store named "Tirge").

However, rather than solely targeting terms, the advertiser 110 may prefer, for some or all of its advertisements, to target a particular audience of users as defined by actions of the users on the advertiser's webpages 111. The ad facilitation server 130 accordingly includes an audience definition module 131 that allows advertisers 110 that employ the services of the server 130 to define and establish audiences for use of the advertisers on the various advertising publishers 120. Details of the audience definition module 131 are provided below in greater detail to respect to FIG. 3.

Figure 3:
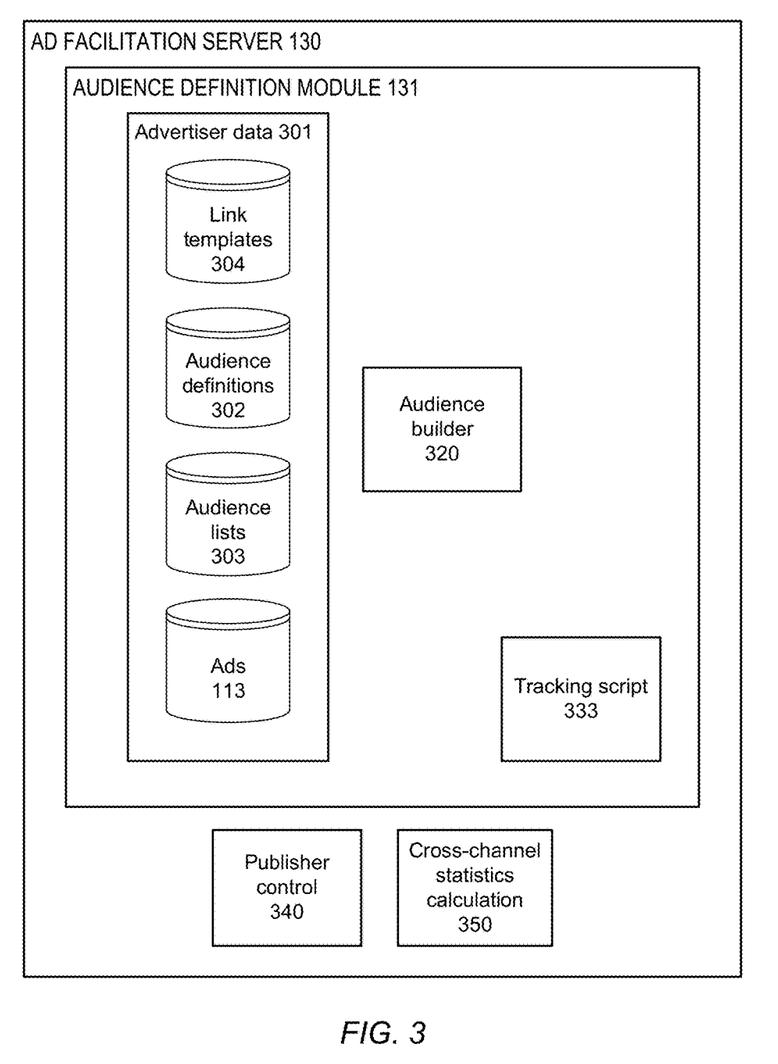
FIG. 3 is a high-level block diagram illustrating a detailed view of the ad facilitation server of FIG. 1, according to one embodiment.

FIG. 3 is a high-level block diagram illustrating a detailed view of the ad facilitation server 130 of FIG. 1, according to one embodiment.

The ad facilitation server 130 comprises, for each advertiser 110 that uses the functionality of the ad facilitation server 130, a set of advertiser data 301 specific to that advertiser.

Figure 4A:
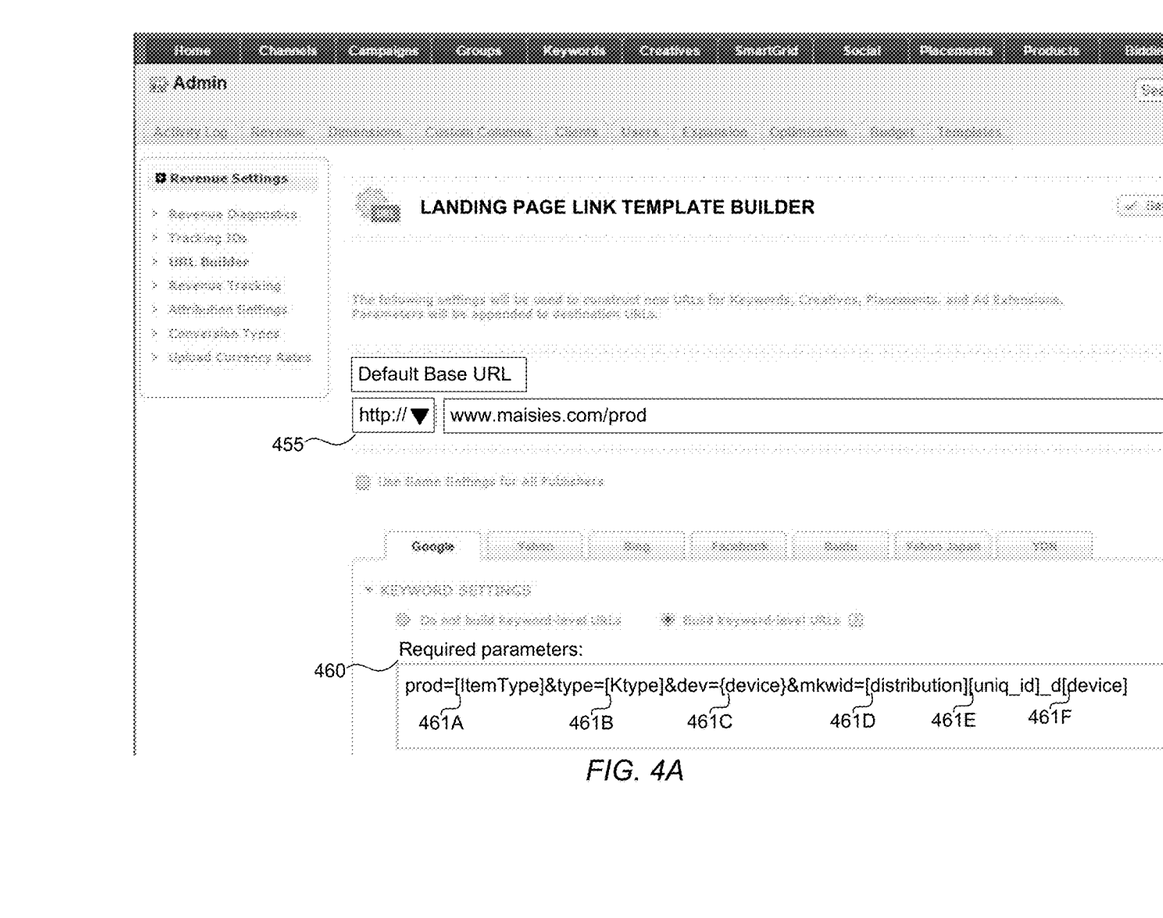
FIG. 4A illustrates a sample user interface for defining landing page link templates, according to one embodiment.

In one embodiment, the advertiser data includes one or more landing page link templates 304 that specify the form that the links (e.g., uniform resource locators (URLs)) of advertisements of the associated advertiser 110 will have. The link templates 304 are composed of a base URL and a parameter expression that defines parameter values to be appended to the base URL, as respectively illustrated in area 455 and 460 the sample user interface of FIG. 4A for defining landing page link templates. The parameter expression can include embedded variable references 461 that will be resolved to actual values either by the ad facilitation server 130 (e.g., by including a variable name within square brackets, such as reference 461A) or by an ad publisher 120 (e.g., by including a variable name within curly brackets, such as reference 461C). For example, assume that the term with text "Maisies Wool Hats" from FIG. 2 were associated with a link template having the base URL "http://www-.maisies.com/prod" and the parameter expression "item=[ItemType]&type=[KType]&dev={device}". In such a case, when forming a landing page URL for the term, the ad facilitation server 130 would substitute the values of the ItemType 205C and KType 205D attributes into the parameter expression portion of the landing page URL. For example, for the term with text "Maisies Wool Hats" from FIG. 2, the resulting landing page URL would be "http://www.maisies.com/prod?item=Hat&type=Self&dev={device}", as a result of substituting the value "Hat" for the attribute "ItemType" and the value "Self" for the attribute "Kype" within the parameter expression. (The particular ad publisher 120 that ultimately selects the advertisement having this landing page URL would substitute the value for the "{device}" parameter variable at the time that it displays the advertisement.) Thus, the link templates 304 permit the flexible generation of landing page URLs that are based in part on attributes of the terms 112 as specified by the advertisers. This in turn allows flexible specification of fine-grained audiences by parsing the term attributes from a landing page URL viewed by an advertisement viewer and using the attributes to identify an audience, as is described later, below.

Returning to FIG. 3, the advertiser data 301 includes audience definitions 302 that include, for each of the audiences that the advertiser 110 wishes to target, a definition of that audience—that is, criteria identifying users that are included in the audience. In one embodiment, an audience definition is specified in terms of uniform resource locators (URLs) of the pages 111 of the advertiser 110 that the users have visited. This defines a "retargeting list" audience—that is, an audience composed of users who have visited the advertiser's web site but failed to take a further action, such as purchasing a viewed product.

Figure 4B:
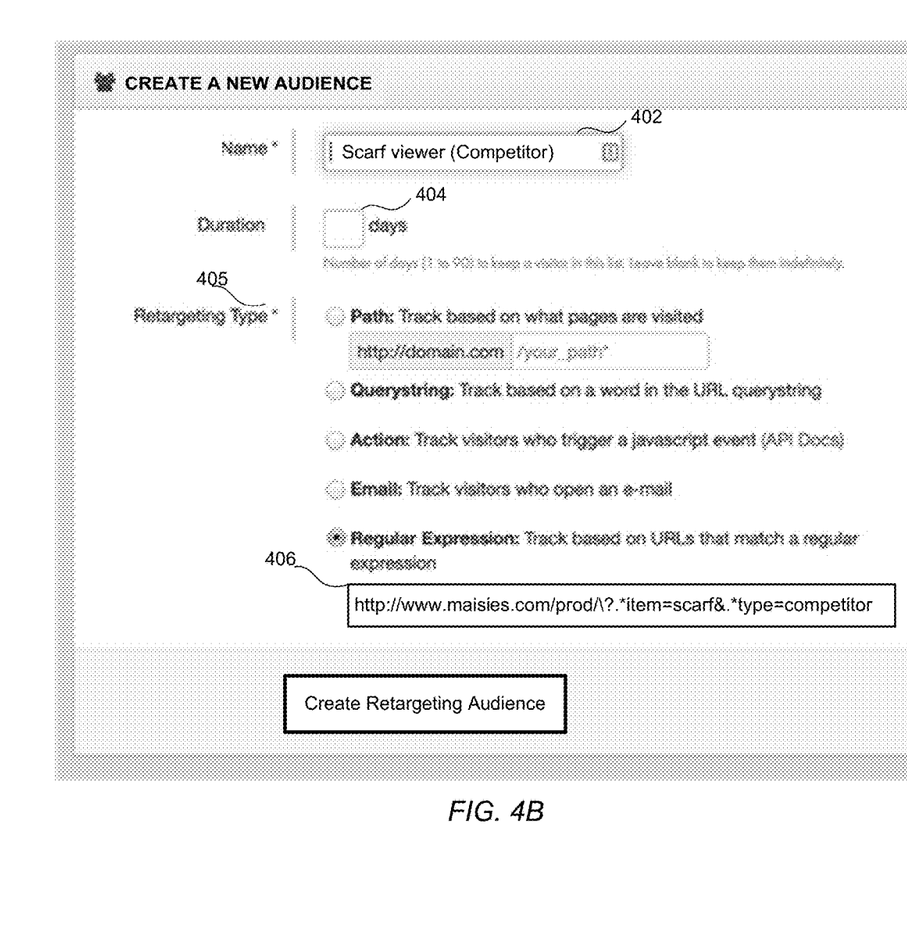
FIG. 4B illustrates an example user interface provided by the ad facilitation server that an advertiser uses to define a new audience, according to one embodiment.

FIG. 4B illustrates an example user interface provided by the ad facilitation server 130 that the advertiser 110 uses to define a new audience, according to one embodiment. The advertiser 110 provides a unique name for the audience in area 402. An amount of time (e.g., a number of days) can optionally be entered into area 404, the amount of time specifying a time window during which the users must have visited the advertiser's pages 111 in order to be considered a visitor. The advertiser 110 provides, in area 406, an audience definition in terms of a regular expression for visited URLs. In the example of FIG. 4B, the advertiser 110 has entered the regular expression "http://www.maisies.com/prod\?.*item=scarf&.*type=competitor", which matches URLs that (among other requirements) include, in the URL parameters, the value "scarf" for the argument "item" and the value "competitor" for the argument "type". Note that the regular expression allows the matching of URLs resulting from a landing page link template 304. As a result, visiting the same page 111, but in response to different contexts created by different terms (e.g., visiting in response to searching for a term associated with a competitor, vs. a term associated with the advertiser), can lead to the visitor being classified in a different audience.

The options 405 also allow an advertiser to define the audience with a simple URL path or word in the URL querystring, rather than the more complicated regular expression, or to define the audience according to non-URL criteria, such as the triggering of JavaScript events on the page being browsed, or the opening of a particular e-mail.

Returning again to FIG. 3, in one embodiment an audience definition 302 may be defined as a set operation (e.g., a set difference) with respect to the users corresponding to other audience definitions 302, which is referred to herein as a "compound" audience definition. For example, assume as above that the regular expression "http://www.maisies.com/prod\?.*item=scarf&.*type=competitor" defines an audience consisting of visitors who viewed the advertiser's scarves after searching for a competitor term, and further assume that the regular expression "http://www.maisies.com/prod/scarf\?.*checkout=true" defines an audience consisting of visitors who purchased a scarf. Then a compound audience definition 302 describing visitors who viewed the advertiser's scarves after searching for a competitor term, but didn't end up purchasing a scarf, could be defined as the set difference between the first audience (those who viewed scarves) and the second audience (those who both viewed and purchased scarves).

The advertiser data 301 includes audience list 303, each audience list corresponding to one of the audience definitions 302 and consisting of users that an audience builder module 320 found to satisfy the criteria specified by the corresponding audience definition 302. In one embodiment, the audience definition module 131 receives the URL being visited, and (optionally) other associated visit information such as an ID for the product being shown on a retail shopping page, or the gender of the user, each time that a visitor visits one of the pages 111 of the advertiser 110.

In one embodiment, the audience definition module 131 receives the URL being visited due to deployment of a tracking script 333 on pages 111 of the advertiser 110. That is, the ad facilitation server 130 makes the tracking script 333 available to advertisers 110 that have contracted with the ad facilitation server to use the server's advertising functionality, and the advertisers include the tracking script on whichever pages 111 of their websites they wish to have visitor tracking functionality. Then, when a visitor 140 visits a page 111 that includes the tracking script 333, the visitor's browser loads the page 111, and the tracking script executes and sends (at least) the URL of the page to the ad facilitation server 130. In one embodiment, the tracking script 333 makes an HTTP request for data (e.g., a single 1×1 pixel image) from the ad facilitation server 130, e.g., by requesting a URL such as www.marin.com/img/pixel?args, where www.marin.com is a domain of the server, and where args represents any additional parameter information that the tracking script 333 has been configured by the advertiser to pass to the server. When the ad facilitation server 130 receives the HTTP request, the audience builder module 320 processes the URL in the request's HTTP Referrer field. If the audience builder module 320 determines that the Referrer URL matches one of the audience definitions 302 for one of its advertisers 110 (e.g., matches the regular expression constituting the audience definition), then the audience builder module adds the visitor (e.g., an Internet Protocol (IP) address of the visitor) to the audience list 303 corresponding to the matching audience definition.

In embodiments in which an audience definition 302 may be a compound audience definition expressed in terms of set differences between other audience definitions, the audience builder module 320 assigns visitors to the audience list 303 for such an audience definition by forming the set difference between the visitors in the audience lists 303 of the audience definitions 302 to which the compound audience definition refers.

In addition to storing the audience lists 303 of an advertiser 110 locally, the audience builder module 320 also establishes the audience lists with the various ad publishers 120. To accomplish this, in one embodiment the audience builder module 320 makes an HTTP request of each of the ad publishers 120 on which the advertiser 110 wishes to advertise (by default, all ad publishers supported by the ad facilitation server 130), e.g., a request for a well-known URL that the ad publisher 120 has provided for the creation of audience lists. For example, one hypothetical ad publisher 120 might use the URL "www.adpublisher.com/audiences?op=add&adv=A&audname=N", where A is a unique identifier of the advertiser 110 on the ad publisher, and N is the name of the audience to be created. This causes the ad publisher 120 to receive, along with the request, any cookies associated with the ad publisher that are stored on the client device of the visitor 140. Since such cookies were placed on the visitor's client device by the ad publisher 120 and include an identifier of the visitor with respect to the ad publisher (e.g. for a social network ad publisher, the unique username of the visitor on the social network), the presence of the cookies allows the ad publisher 120 to identify the visitor and add the visitor to the given audience list for the given advertiser. If the visitor's client device does not provide any cookies that permit the ad publisher 120 to identify the visitor, then the ad publisher 120 can decline to make an addition to the audience list.

Note that by using this approach of storing local audience definitions 302, the ad facilitation server 130 need not share any details of the advertiser's definition of the audience, other than the actual list of members of the audience. This enhances the ability of the advertisers 110 to retain proprietary information.

Since each ad publisher 120 typically has different requirements for adding a user to an audience, such as different URLs, different argument names, and the like, the ad facilitation server 130 uses a publisher control module 340 to interface with the different ad publishers in their expected formats.

The ad facilitation server 130 comprises a cross-channel statistics calculation module 350 that determines how to allocate an advertising budget across different channels for the same audience. For example, assume that a particular advertiser 110 had defined an audience consisting of those who had viewed scarves after searching for a competitor's products but didn't buy a scarf, and established the audience on two distinct ad publishers 120 running search advertisements and an ad publisher 120 running social advertisements. In such a case, advertising to the same audience would likely have different levels of success (e.g., different click through rates, conversion rates, or other advertising metrics) on the different ad publishers. Accordingly, the cross-channel statistics calculation module 350 obtains statistics from the different ad publishers 120 regarding the effectiveness of advertising to the audience (e.g., the number of impressions, number of clicks, and the like), and calculates advertising performance metrics (e.g., click through rate, number of conversions, total revenue) based on the statistics. In one embodiment, the cross-channel statistics module 350 analyzes the advertising performance metrics across the various ad publishers 120 for a given audience. Based on the relative performances of the different ad publishers 120 with respect to each other for that audience (e.g., Publisher A performs 20% better than Publisher B with respect to the revenue metric for the audience), the cross-channel statistics module 350 allocates different amounts of an advertiser's advertising budget for an audience to the different ad publishers. In one embodiment, the cross-channel statistics module 350 further indicates how to allocate the budget across the different channels to maximize a given advertising performance metric, e.g., that 61% of the budget should be allocated to the search channel and 39% to the social channel in order to maximize revenue.

Figure 5:
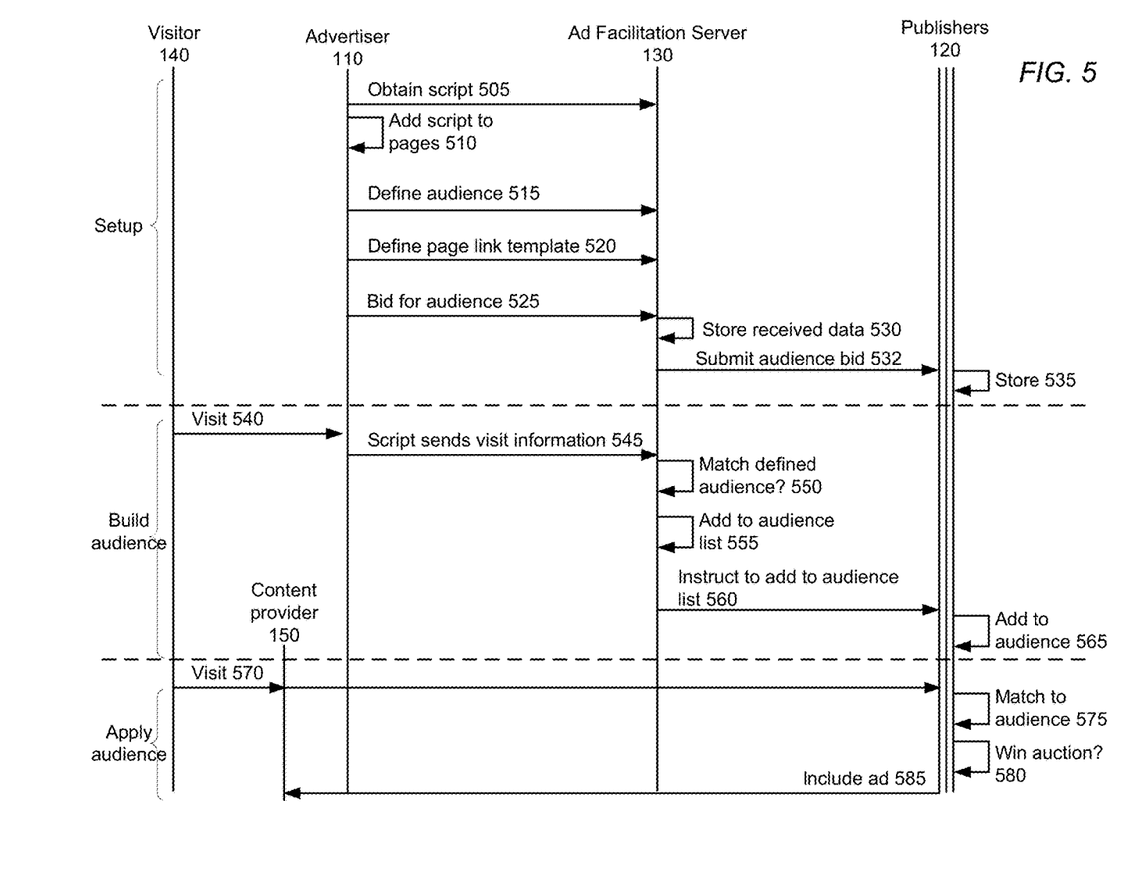
FIG. 5 illustrates the interactions between a visitor, advertiser, ad facilitation server, ad publisher, and content provider when an advertiser chooses to target an audience for advertisements, according to one embodiment.

FIG. 5 illustrates the interactions between a visitor 140, advertiser 110, ad facilitation server 130, ad publisher 120, and content provider 150 when an advertiser chooses to target an audience for advertisements, according to one embodiment.

The advertiser 110 has a site made up of web pages 111 on which it offers its products or services. Visitors 140 may browse these pages 111 directly by entering the URL of the site into a browser or by searching for the site in the search engine. Visitors 140 may also arrive at the pages 111 in response to clicking on or otherwise selecting advertisements of the advertiser 110 that are provided by one of the ad publishers 120 and that when selected link to the pages 111.

In order to define an audience of visitors for advertisement targeting based on the actions of the visitors on the advertiser's website, the advertiser 110 obtains 505 a tracking script 333 from the ad facilitation server 130 and adds 510 the script to any pages 111 based on which the advertiser wishes to define an audience.

The advertiser 110 further defines 515 an audience on the ad facilitation server 130 for each distinct audience that the advertiser wishes to target. In one embodiment, an audience is defined in terms of the URLs of the pages 111 that visitors 140 have visited. For example, an audience can be defined using a regular expression for matching URLs, such as using the regular expression "http://www.maisies.com/prod/\?.*prod=scarf&.*type=competitor" to define an audience consisting of visitors who have viewed product pages 111 about scarves within the context of searching for a competitor's products. An audience may also be defined in terms of other audiences, such as defining an audience of those who viewed product pages about scarves but didn't purchase them as the set difference between visitors who viewed product pages about scarves, and visitors who did purchase scarves after viewing them.

The advertiser 110 also defines 520 one or more landing page link templates 304 on the ad facilitation server 130. The landing page link templates 304 permit the flexible specification of URLs or other links for the product or service landing pages 111 to which a given advertisement 113 will link. In one embodiment, the link templates 304 are composed of a base URL portion (e.g., "http://www.maisies.com/prod") and a parameter expression that defines parameters to be appended to the base URL, where the parameter values can be dynamically determined by the ad facilitation server 130 based on variable references corresponding to attributes of the advertisements 113, and substituted into the template to generate a concrete URL. The use of variable references within the parameter expression simplifies the establishment of fine-grained audiences.

The advertiser 110 also submits 525 bids for each of the specific audiences that it wishes to target. As part of the submission of the bid, the advertiser 110 specifies an identifier of the given audience, and the specific bid amount that it is willing to pay for advertisements to be presented to a visitor 140 belonging to the audience. In one embodiment, the advertiser 110 may specify a single bid for an audience to be used on all the ad publishers 120, or may specify a separate bid for that audience on each of the ad publishers 120. The submission also specifies (possibly implicitly) a landing page link template 304 that the ad will use. For example, in embodiments in which each defined audience also has a corresponding landing page link template 304, the specification of the audience implicitly specifies the template 304.

The ad facilitation server 130 accordingly stores 530 the data received from the advertiser 110—that is, the audience definition 302, the landing page link template 304, and the advertiser's bid for ads targeted to the audience—in association with the advertiser. The ad facilitation server 130 also establishes the advertiser's bid for the given audience by submitting 532 the audience bid to each of the ad publishers 120 on which the advertiser 110 has elected to advertise, along with any advertisements to be displayed to that audience, and the bid value that the advertiser is willing to pay for advertisements to be presented to that audience. Each ad publisher 120 accordingly stores 535 the audience-related data, including the name of the audience, the advertisements to be displayed to that audience, and the bid value that the advertiser is willing to pay.

Thus, steps 515-535 resulted in the initial establishment of the desired audience on the different ad publishers 120. However, the audience does not yet include any members to whom to advertise. Rather, the operation of the script that was added to pages at step 510 gradually establishes the audience members over time as visitors 140 visit the pages 111 of the advertiser. Specifically, a visitor 140 visits 570 of the pages 111 of the advertiser 110. The visit may be the result of the visitor 140 browsing the page 111 directly, or via a search engine, or by selecting an advertisement of the advertiser 110 for which the page 111 is the landing page. The tracking script 333 on the page 111 executes in response to the visit, sending 545 information about the visit to the ad facilitation server 130, e.g., by sending an HTTP request for data, which implicitly includes the URL used to arrive at the page in the HTTP Referrer field. The sent information includes the URL, plus any other information that the script 333 specified.

The ad facilitation server 130 determines 550 whether the URL matches the defined audience. For example, in embodiments in which an audience definition 302 is specified as a regular expression, the ad facilitation server 130 determines 550 whether the URL matches the regular expression defining the audience. If the URL matches the defined audience, then the ad facilitation server 130 adds the current visitor to the audience list for the audience. Adding the visitor to the audience list includes adding 555 an identifier of the visitor (e.g., an IP address) within the corresponding local audience list 303, and also instructing 560 each of the ad publishers 120 to add that visitor to an audience already created. In one embodiment, the instruction 560 is accomplished using an HTTP request, which causes the ad publishers 122 receive any cookies stored by the visitor device for their respective domains. If the cookies include an identifier of the visitor, the ad publisher 120 adds that identifier to their own audience definitions that were created in step 535.

With the audiences established via step 535, and visitors added as members of the audiences via step 565, the various ad publishers 120 are able to provide targeted ads to the audiences. When a visitor 140 visits 570 a content provider 150, the ad publisher 120 obtains notice of the visit, either because the ad publisher is itself the content provider 150 being visited, or because a third party content provider 150 is using the ad publisher to provide ads for its content. The ad publisher 120 determines 575 whether the visit matches one of the defined audiences—that is, whether the particular visitor 140 is a member of one of the audiences defined via step 535. (The ad publisher 120 can identify the visitor 140 via the cookies that are sent by the visitor's client device.) If the visit matches 575 one of the audiences, then the ad publisher 120 includes the bid of the advertiser 110 submitted in step 532 as part of the ad auction process for a given ad impression. If the bid of the advertiser 110 is the winning bid for the ad impression, one of the advertisements of the advertiser is selected and included 585 within content served to the visitor 140.

Note that the steps need not appear in the exact order shown in FIG. 5. For example, steps 510, 515, and 520 may be performed in any order with respect to each other. Similarly, occurrences of steps 570-585 may occur intermixed with occurrences of steps 540-565—that is, advertising to an audience may take place even while the audience is still in the process of being built.

Figure 6:
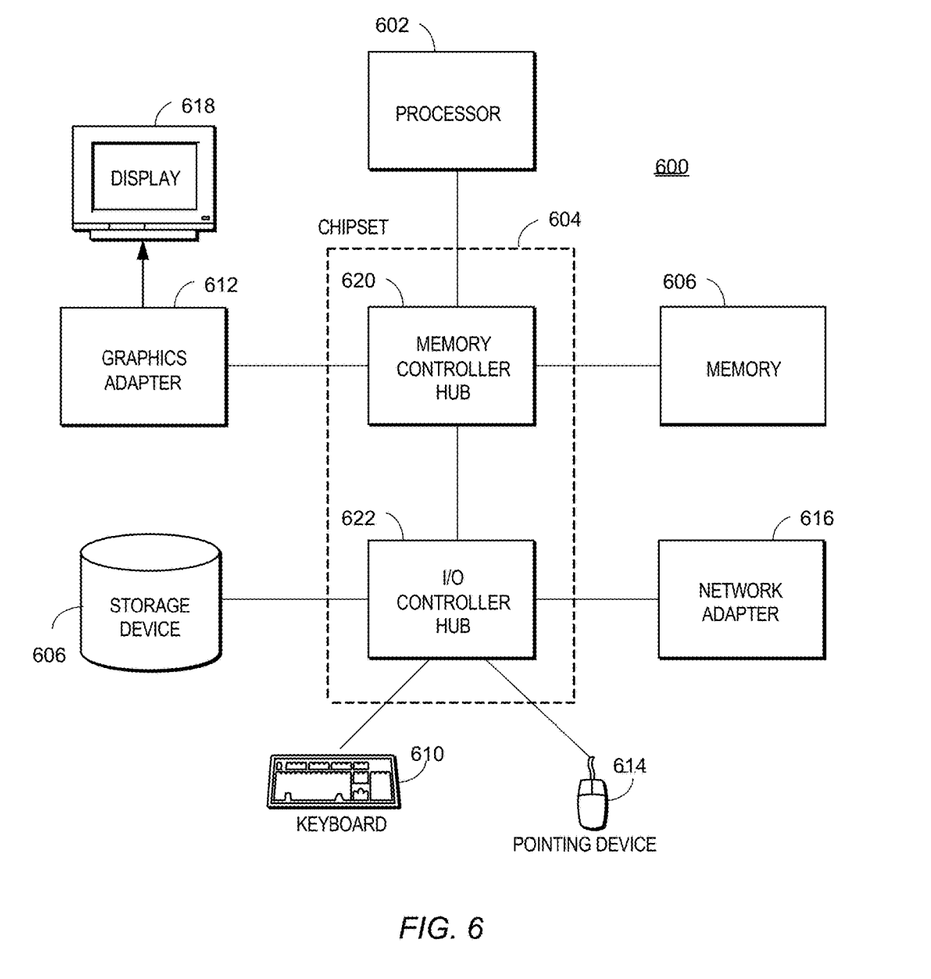
FIG. 6 is a high-level block diagram illustrating physical components of a computer used as part or all of the analysis server, the advertiser, the advertising publisher, the visitor, and/or the content provider from FIG. 1, according to one embodiment.

FIG. 6 is a high-level block diagram illustrating physical components of a computer 600 used as part or all of the ad facilitation server 130, the advertiser 110, the advertising publisher 120, the visitor 140, and/or the content provider 150 from FIG. 1, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by an ad facilitation server, the method comprising:

providing, to an online advertiser, a tracking script, the tracking script for inclusion, by the advertiser, on a webpage of the advertiser such that the tracking script executes when the webpage is loaded in a browser and sends information about the webpage;

receiving, from the advertiser, a landing page link template specifying a format of links associated with advertisements of the advertiser, wherein the landing page link template includes a base uniform resource locator (URL) and a parameter list, the parameter list including a first variable reference corresponding to a property of terms to be resolved by the ad facilitation server, and a second variable reference corresponding to a property of terms to be resolved by a publisher at the time the publisher displays the advertisements;

accessing a set of values of properties associated with terms of the advertiser;

generating, for a term of the advertiser, a landing page URL based on the landing page link template, the landing page URL including, in place of the first variable reference, a value of a property associated with the term of the advertiser, the value obtained from the accessed set of values of properties associated with terms of the advertiser, and the landing page URL further including the second variable reference to be resolved by a publisher;

receiving, from the advertiser, a definition of an audience, the definition implemented in terms of a uniform resource locator (URL) expression, wherein the URL expression is a regular expression, the regular expression including at least one wildcard character, and the audience comprising identifiers of users;

providing, to each of a plurality of publishers, an audience bid for the publisher to publish an advertisement to an audience, the audience bid comprising the advertisement and the generated landing page URL to be published in association with the advertisement;

receiving, via the tracking script included on a webpage of the advertiser, a URL corresponding to a visitor's visit to a page of the advertiser in response to the visitor accessing an advertisement having the landing page URL;

determining that characters of the received URL match a pattern defined by the URL expression associated with the definition of the audience, wherein the determining includes matching the wildcard in the regular expression against multiple characters in the received URL; and in response to determining that the characters of the received URL match the pattern defined by the URL expression:

for each of the plurality of publishers, sending a request to the publisher to add the visitor to the audience associated with the provided audience bid.

2. The computer-implemented method of claim 1, wherein the received URL is the landing page URL and was received in response to the visitor selecting an advertisement associated with a term of the advertiser after the first one of the publishers provided the advertisement to the visitor.

3. The computer-implemented method of claim 1, further comprising sending requests to the plurality of publishers to add a second visitor to a second audience of the advertiser, responsive to receiving a second URL having a same base URL but a different value of the property for the term in the parameter list.

4. The computer-implemented method of claim 1, wherein sending the request to add the visitor to each of the plurality of the publishers comprises identifying a plurality of different request formats for the plurality of publishers and sending the requests in the plurality of different request formats.

5. The computer-implemented method of claim 1, wherein the plurality of publishers include a plurality of different channels, the method further comprising:

obtaining statistics from the publishers regarding effectiveness of advertising to the audience; and using the obtained statistics, generating models predicting an advertising bid required to achieve a given advertising performance metric value on the different channels.

6. The computer-implemented method of claim 5, further comprising determining an amount of an advertising budget to allocate to each of the channels to maximize the given advertising performance metric.

7. The computer-implemented method of claim 1, wherein the definition of the audience is implemented as a set difference of a first set of visitors who visited URLs matching a first URL expression and a second set of visitors who visited URLs matching a second URL expression.

8. A non-transitory computer-readable storage medium comprising instructions executable by a processor, the instructions to be performed by an ad facilitation server and the instructions comprising:

instructions for providing, to an online advertiser, a tracking script, the tracking script for inclusion, by the advertiser, on a webpage of the advertiser such that the tracking script executes when the webpage is loaded in a browser and sends information about the webpage;

instructions for receiving, from the advertiser, a landing page link template specifying a format of links associated with advertisements of the advertiser, wherein the landing page link template includes a base uniform resource locator (URL) and a parameter list, the parameter list including a first variable reference corresponding to a property of terms to be resolved by the ad facilitation server, and a second variable reference corresponding to a property of terms to be resolved by a publisher at the time the publisher displays the advertisement;

instructions for accessing a set of values of properties associated with terms of the advertiser;

instructions for generating, for a term of the advertiser, a landing page URL based on the landing page link template, the landing page URL including, in place of the first variable reference, a value of a property associated with the term of the advertiser, the value obtained from the accessed set of values of properties associated with terms of the advertiser, and the landing page URL further including the second variable reference to be resolved by a publisher;

instructions for receiving, from the advertiser, a definition of an audience, the definition implemented in terms of a uniform resource locator (URL) expression, wherein the URL expression is a regular expression, the regular expression including at least one wildcard character, and the audience comprising identifiers of users;

instructions for providing, to each of a plurality of publishers, an audience bid for the publisher to publish an advertisement to an audience, the audience bid comprising the advertisement and the generated landing page URL to be published in association with the advertisement;

instructions for receiving, via the tracking script included on a webpage of the advertiser, a URL corresponding to a visitor's visit to a page of the advertiser in response to the visitor accessing an advertisement having the landing page URL;

instructions for determining that the characters of the received URL match a pattern defined by the URL expression associated with the definition of the audience, wherein the determining includes matching the wildcard in the regular expression against multiple characters in the received URL; and instructions for, in response to determining that the characters of the received URL match the pattern defined by the URL expression:

for each of the plurality of publishers, sending a request to the publisher to add the visitor to the audience associated with the provided audience bid.

9. The non-transitory computer-readable storage medium of claim 8, wherein the received URL is the landing page URL and was received in response to the visitor selecting an advertisement associated with a term of the advertiser after the first one of the ad publishers provided the advertisement to the visitor.

10. The non-transitory computer-readable storage medium of claim 8, the instructions further comprising instructions for sending requests to the plurality of publishers to add a second visitor to a second audience of the advertiser, responsive to receiving a second URL having a same base URL but a different value of the property for the term in the parameter list.

11. The non-transitory computer-readable storage medium of claim 8, wherein sending the request to add the visitor to each of the plurality of the publishers comprises identifying a plurality of different request formats for the plurality of the ad publishers and sending the requests in the plurality of different request formats.

12. The non-transitory computer-readable storage medium of claim 8, wherein the plurality of publishers include a plurality of different channels, the instructions further comprising:
- instructions for obtaining statistics from the publishers regarding effectiveness of advertising to the audience; and
- instructions for using the obtained statistics, generating models predicting an bid advertising required to achieve a given advertising performance metric value on the different channels.

13. The non-transitory computer-readable storage medium of claim 12, the instructions further comprising instructions for determining an amount of an advertising budget to allocate to each of the channels to maximize the given advertising performance metric.

14. The non-transitory computer-readable storage medium of claim 8, wherein the definition of the audience is implemented as a set difference of a first set of visitors who visited URLs matching a first URL expression and a second set of visitors who visited URLs matching a second URL expression.

\* \* \* \* \*

UNITED STATES PATENT AND TRADEMARK OFFICE
CERTIFICATE OF CORRECTION

PATENT NO. : 10,360,589 B1
APPLICATION NO. : 14/657351
DATED : July 23, 2019
INVENTOR(S) : Anil Channappa Page 1 of 1

It is certified that error appears in the above-identified patent and that said Letters Patent is hereby corrected as shown below:

On the Title Page

In Column 1, under Inventors, delete "Matt Ackley" and insert -- Matthew Ackley --

In the Claims

In Column 15, Claim 12, Line 9, delete "an bid" and insert -- a bid --

Signed and Sealed this
Seventh Day of January, 2020

Andrei Iancu
*Director of the United States Patent and Trademark Office*